United States Patent
Miller

(10) Patent No.: US 9,067,366 B2
(45) Date of Patent: Jun. 30, 2015

(54) FLOTATION DEVICE REPAIR COMPOSITION AND METHOD

(75) Inventor: Ryan Miller, Queensland (AU)

(73) Assignee: Lend Holdings Pty. Ltd, Moore Creek (AU)

(*) Notice: Subject to any disclaimer, the term of this patent is extended or adjusted under 35 U.S.C. 154(b) by 0 days.

(21) Appl. No.: 13/697,561

(22) PCT Filed: May 24, 2011

(86) PCT No.: PCT/AU2011/000621
§ 371 (c)(1),
(2), (4) Date: Nov. 13, 2012

(87) PCT Pub. No.: WO2011/146980
PCT Pub. Date: Dec. 1, 2011

(65) Prior Publication Data
US 2013/0059950 A1    Mar. 7, 2013

(30) Foreign Application Priority Data

May 24, 2010    (AU) .................................. 2010902242

(51) Int. Cl.
| C08L 47/00 | (2006.01) |
| C08L 33/06 | (2006.01) |
| C09K 3/12 | (2006.01) |
| C08K 13/02 | (2006.01) |
| C08K 3/34 | (2006.01) |
| C08L 19/00 | (2006.01) |
| C08L 93/00 | (2006.01) |
| B29C 73/02 | (2006.01) |
| C08L 91/06 | (2006.01) |
| C08L 91/08 | (2006.01) |
| B29C 73/16 | (2006.01) |

(52) U.S. Cl.
CPC ............... *B29C 73/02* (2013.01); *B29C 73/163* (2013.01); *C08K 3/34* (2013.01); *C08K 3/346* (2013.01); *C08L 91/06* (2013.01); *C08L 91/08* (2013.01)

(58) Field of Classification Search
CPC ......... C08L 47/00; C08L 33/06; C08L 91/06; C08L 91/08; C08K 3/346; C08K 13/02; C08K 3/34; C09K 3/12; B29C 73/02
USPC ....................... 524/77, 315, 442; 106/33, 272
See application file for complete search history.

(56) References Cited

U.S. PATENT DOCUMENTS

| 2,601,016 A * | 6/1952 | Hendricks et al. ...... 428/355 BL |
| 4,146,514 A * | 3/1979 | Matubara et al. ............. 525/237 |
| 5,017,222 A | 5/1991 | Cifentes et al. |
| 5,387,434 A | 2/1995 | Black |
| 2007/0105977 A1 * | 5/2007 | Gabriel et al. ................. 523/122 |
| 2009/0239828 A1 * | 9/2009 | Yamazaki et al. ............. 514/108 |

FOREIGN PATENT DOCUMENTS

| CN | 101659839 A | 3/2010 |
| GB | 1283412 A | 7/1972 |

OTHER PUBLICATIONS

Machine translation of CN 101659839. Mar. 2010.*

* cited by examiner

*Primary Examiner* — John Uselding
(74) *Attorney, Agent, or Firm* — David A. Guerra

(57) ABSTRACT

A flotation device temporary repair composition comprising a wax and a metal silicate. Further ingredients may include mineral oil, elastomeric polymers, pigment agents and aroma agents. The repair composition is suitable for repairing a flotation device, such as a surfboard, by simple application into the damaged area to form an instant watertight seal, without the need for curing, and can be removed by hand at a later date to allow more permanent repair.

12 Claims, No Drawings

FLOTATION DEVICE REPAIR COMPOSITION AND METHOD

CROSS-REFERENCE TO RELATED APPLICATIONS

This application is an U.S. national phase application under 35 U.S.C. §371 based upon co-pending International Application No. PCT/AU2011/000621 filed on May 24, 2011. Additionally, this U.S. national phase application claims the benefit of priority of co-pending International Application No. PCT/AU2011/000621 filed on May 24, 2011 and Australia Application No. 2010902242 filed on May 24, 2010. The entire disclosures of the prior applications are incorporated herein by reference. The international application was published on Dec. 1, 2011 under Publication No. WO 2011/146980 A1.

FIELD OF THE INVENTION

The present invention relates to a flotation device repair composition. In particular, this invention relates to a flotation device repair composition which is used to temporarily repair a damaged region of a flotation device to enable the device to be used in the water immediately thereafter.

BACKGROUND OF THE INVENTION

In a modern active society, people are increasingly seeking enjoyable ways to spend their leisure time. The popularity of water sports has risen significantly due to promotion of healthy active lifestyles and better access to beaches. Most water sports can be enjoyed at little or no cost, contributing to a growing number of people enjoying the water on a daily basis. Many water activities use a flotation device to assist a user in remaining on the water for prolonged periods as well as to aid in catching and riding waves. Typical flotation devices include surfboards, shorter body or 'boogie' boards, paddle boards, kayaks and boats.

Many of these activities involve catching waves into the shore. In doing so, the device can often become damaged though crashing onto rocks and collisions with other such devices. Damage may also occur during transit of the flotation device. Boats may collide with floating debris or with other boats or mooring structures.

Damage usually results in one or more holes in the device or at least a breach of the protective outer surface thereof. Unfortunately, a hole in the exterior of a device, such as a surfboard, allows water to ingress to the core thereby destroying the integrity of the structure and its consequential floating capacity. Generally, scratches and cuts in the outer layer of the boards, particularly those made of fibreglass, render the board useless if water is allowed to enter the core.

Permanent repairs can be made by filling the holes, usually with the aid of fibreglass bonding kits. However, this resin-based approach requires a large amount of time to process the damaged area and recondition the board, thereby immediately stopping its use until the board is permanently repaired. It is not uncommon for the board to be out of use for a week or more.

Water sports enthusiasts, most particularly surfers, have attempted to address this problem by using temporary fixes such as filling a hole with 'surf wax' ordinarily applied to create a non-slipping surface in the water. Unfortunately, the wax is very difficult to remove when the board is taken for repair and requires extra board removal in the process. Additionally, the wax does not create a perfect seal to keep the water out of the board, and thus water ingress damages the wood rails and foam inlays within the fibreglass.

An alternative approach is to use an epoxy stick to fill in damaged areas, however this still requires a number of hours to allow it to set prior to board use.

Another available repair kit is based on microlite putty using ketone solvents and sanding, however such putty kits are unsuitable for use on Styrofoam-based blank flotation devices which make up the major share of the surf board market. The sanding and other process time also means a user cannot continue in the water for an extended period after the damage occurs.

OBJECT OF THE INVENTION

Accordingly, it is an object of the invention to provide a flotation device repair composition and method for the temporary repair of a flotation device which alleviates or overcomes one or more of the abovementioned problems or provides the consumer with a useful commercial alternative.

SUMMARY OF THE INVENTION

In a first aspect, the invention resides in a flotation device repair composition comprising a wax and a metal silicate as the major % by weight components.

Preferably, the wax and metal silicate form at least 20% by weight of the composition.

More preferably, the wax and metal silicate form at least 40% by weight of the composition.

Even more preferably, the wax and metal silicate form at least 60% or at least 70% by weight of the composition.

The wax may be an animal wax, plant derived wax, petroleum wax or synthetic wax.

Suitably, the wax is selected from the group consisting of lanolin, beeswax, microcrystalline wax, carnauba wax, jelly wax, soy wax, palm wax, synthetic wax and paraffin wax.

Preferably, the wax is a combination of lanolin, in an amount of between 1 to 20%, preferably 1 to 15%, more preferably 1 to 10% by weight, and another wax selected from the group consisting of beeswax, microcrystalline wax, carnauba wax, jelly wax, soy wax, palm wax and paraffin wax.

The metal silicate may be selected from the group consisting of aluminium silicates, magnesium silicates, sodium silicates and calcium silicates.

Preferably, the metal silicate is a clay.

The wax and the metal silicate may be present in an amount between 30 to 50% by weight of the composition.

Preferably, the composition further comprises mineral oil.

In one preferred embodiment, the composition further comprises an elastomeric polymer and/or a resin.

Preferably, the elastomeric polymer is a polyisobutene and the resin is pine resin.

If required, the composition may further comprise petroleum jelly and/or glycerine.

Optionally, the composition may further comprise a pigment agent and/or an aroma agent.

In a preferred embodiment of the first aspect, the composition comprises:
Clay—20 to 60%
Wax—20 to 60%
Mineral oil—1 to 20%
Lanolin—1 to 20%
Elastomeric polymer/Resin—3 to 25%
by weight of the composition.

Preferably, the clay is ball clay.

Suitably, the wax is selected from the group consisting of beeswax, microcrystalline wax, carnauba wax, jelly wax, soy wax, palm wax, synthetic wax and paraffin wax.

Preferably, the elastomeric polymer is a polyisobutene such as Oppanol® and the resin is pine resin.

Optionally, the composition may further comprise a pigment and/or an aroma agent in a % by weight amount of 5 to 15%.

In a further preferred embodiment of the first aspect, the composition comprises:
Clay—30 to 50%
Wax—25 to 45%
Mineral oil—1 to 10%
Lanolin—1 to 10%
Elastomeric polymer/Resin—5 to 20%
by weight of the composition.

Preferably, the clay is ball clay.

Suitably, the wax is selected from the group consisting of beeswax, microcrystalline wax, carnauba wax, jelly wax, soy wax, palm wax, synthetic wax and paraffin wax.

Preferably, the elastomeric polymer is a polyisobutene such as Oppanol® and the resin is pine resin.

Optionally, the composition may further comprise a pigment and/or an aroma agent in a % by weight amount of 5 to 15%.

In still a further preferred embodiment of the first aspect, the composition comprises:
Clay—35 to 45%
Wax—30 to 40%
Mineral oil—2 to 5%
Lanolin—2 to 5%
Elastomeric polymer/Resin—7 to 12%
by weight of the composition.

Preferably, the clay is ball clay.

Suitably, the wax is selected from the group consisting of beeswax, microcrystalline wax, carnauba wax, jelly wax, soy wax, palm wax, synthetic wax and paraffin wax.

Preferably, the elastomeric polymer is a polyisobutene such as Oppanol® and the resin is pine resin.

Optionally, the composition may further comprise a pigment and/or an aroma agent in a % by weight amount of 5 to 15%.

In a second aspect, the invention resides in a method of formulating the flotation device repair composition of the first aspect including the step of combining a wax and a metal silicate.

The method may further include the step of applying heat.

The method may further include the step of increasing the amount of metal silicate in the composition to improve its suitability for use in warmer climates.

In a third aspect, the invention resides in a method of temporarily repairing a flotation device including the steps of forming the flotation device repair composition of the first aspect and applying an effective amount of the composition to a damaged region of the flotation device to form a watertight seal around the region and thereby temporarily repair the flotation device.

The seal between the composition and the flotation device becomes watertight immediately upon application.

Substantially all of the applied composition can be removed from the damaged region by hand.

The flotation device may be selected from the group consisting of surfboards, funboards, paddle boards, sailboards, surf skis, kayaks, canoes, boats and flotation aids.

The various features and embodiments of the present invention, referred to in individual sections apply, as appropriate, to other sections, mutatis mutandis. Consequently features specified in one section may be combined with features specified in other sections as appropriate.

In this specification, unless the context requires otherwise, the terms "comprises", "comprising" or similar terms are intended to mean a non-exclusive inclusion, such that a product, composition, method, system or apparatus that comprises a list of elements does not include those elements solely, but may well include other elements not listed.

DETAILED DESCRIPTION OF THE PREFERRED EMBODIMENTS

The invention provides a composition and method for the temporary repair of a flotation device, such as surfboards and boats. It will be appreciated by a skilled person that the composition may be used in any number of flotation devices, including but not limited to, surfboards, funboards, paddle boards, sailboards, surf skis, kayaks, canoes, as well as boats and certain flotation aids.

As used herein, "apply", "applied" or "applying" means to locate the composition for flotation device temporary repair within and, over the damaged region to form a layer which covers that region and which makes a seal with the surrounding area of the device to effectively form a substantially watertight plug.

The present invention provides, for the first time, a composition for flotation device temporary repair that allows immediate use of the damaged device in water following composition application rather than requiring a delay to allow processing of the damaged area or for a repair system to cure, set or otherwise dry prior to use in water. For example, if a surfboard is found to have been damaged in transit to the beach then the present composition can be simply applied to the damaged area and the surfboard is immediately made watertight and suitable for use in the water. No sanding, clearing out of the damaged area or waiting for the composition to set, is required. Further, the composition of the invention can be easily removed from the flotation device by hand with the application of minimal force to leave the damaged region free of composition and ready for more permanent or aesthetically pleasing repair. The removal of the composition does not require the cutting of portions of the flotation device, as is the case with other temporary measures.

In a first aspect, the invention resides in a flotation device repair composition comprising a wax and a metal silicate as the major % by weight components.

Preferably, the wax and metal silicate form at least 20% by weight of the composition, more preferably at least 40% by weight, even more preferably at least 60% by weight, still more preferably at least 70% by weight.

The wax in the composition of the first aspect may comprise more than one different type of wax. The wax may be an animal wax, plant derived wax, petroleum wax or synthetic wax. Suitably, the wax is selected from the group consisting of lanolin, beeswax, microcrystalline wax, carnauba wax, jelly wax, soy wax, palm wax, synthetic wax and paraffin wax.

Microcrystalline waxes are produced by de-oiling petrolatum and contain high molecular weight saturated aliphatic hydrocarbons. The typical microcrystalline wax crystal structure is fine, making it more flexible than paraffin wax.

Lanolin is a waxy substance obtained from wool and is composed mainly of long chain waxy esters with further components being a complex mixture of lanolin alcohols, lanolin acids and lanolin hydrocarbons. Lanolin provides a plasticity and flexibility to the composition and, importantly, it provides a slippery surface to the composition when submerged which greatly reduces friction and drag in the water.

The synthetic wax may be polyethylene based, polymethylene based a Fischer-Tropsch wax or the like.

The wax is a key ingredient in the present repair composition as it provides the composition with its water-proofing integrity to resist the ingress of water into the damaged region of a repaired flotation device. Importantly, it has unexpectedly been found by the inventor that the wax also interacts with the other ingredients of the preferred compositions to play a role as a 'housing' or 'retaining' component for them. The wax appears to retain these ingredients in intimate contact, ingredients which would otherwise disperse or separate, to thereby provide the desired properties to the composition.

Beeswax, microcrystalline wax, paraffin wax and, particularly, lanolin, are preferred waxes for use in the present invention for reasons already discussed. Although not limited thereto, in preferred embodiments of the first aspect, the composition will typically comprise between 30 to 40% by weight of a base wax, such as microcrystalline wax, beeswax or paraffin wax, and a smaller amount, for example 1 to 10% by weight, of lanolin.

The metal silicate may be selected from the group consisting of aluminium silicates, magnesium silicates, sodium silicates and calcium silicates.

Ground talcum stone is just one example of a magnesium silicate which may be suitable. A wide range of aluminium silicates (clays) are considered appropriate for use in the present composition.

Preferably, the metal silicate is a clay.

The clay may be selected from the group consisting of ball clays, kaolinites, montmorillonites, chlorites, illites, smectorites, vermiculites, stevensites, hectorites, betonite.

In a preferred embodiment the clay is a ball clay. Ball clays are natural, fine-grained kaolinitic sedimentary clays that commonly consist of 20-80% kaolinite, 10-25% mica and 6-65% quartz. The ball clays are the most plastic of all clays and are used to impart plasticity onto the composition. Generally, the clay component within the composition acts as a binding ingredient and provides suitable strength and density as well as being key to achieving the required degree of flexibility.

Optionally, kaolin clay may be employed where rebalancing of oiliness of the composition is desirable, for example, for use in warmer climes.

The wax and the metal silicate may each be present in an amount between 10 to 80% by weight of the composition, preferably 20 to 60%, more preferably 30 to 55%. Thus, the wax may be present in a % by weight amount (relative to the total weight of the composition) of between about 10%-20%, 20-30%, 30%-40%, 40%-50%, 50%-60%, 60%-70% or 70%-80%. Likewise, the metal silicate, preferably clay, component may be present in a % by weight amount (relative to the total weight of the composition) of between about 10%-20%, 20-30%, 30%-40%, 40%-50%, 50%-60%, 60%-70% or 70%-80%. A preferred range for the wax component is 30% to 45% and for the clay component is 40% to 55%.

In one particularly preferred embodiment, the composition comprises about 41% by weight clay and about 38% by weight wax, including about 35% base wax and about 3% lanolin, with the balance being made up by one or more further ingredients as will be specified below.

Preferably, the composition further comprises mineral oil.

Mineral oil (also known as white oil or paraffin oil) is a liquid by-product of the distillation of petroleum and comprises a mixture of alkanes generally in the $C15$ to $C40$ range, as well as certain cyclic paraffins. It is related to petroleum jelly but is differentiated in being a liquid petrolatum product. Mineral oil is a cheap and widely available commercial product. The three classes of refined mineral oils are paraffinic oils, naphthenic oils and aromatic oils. While the paraffinic oil is preferred, each of the classes are contemplated.

In the present compositions the mineral oil has been found to act upon the wax component. This interaction causes the wax or waxes to soften to a desirable level of malleability and cohesion. This improved plasticity aids in manipulating the composition into the damaged region of a flotation device which is being repaired.

The mineral oil may be present in the composition of the first aspect in a % by weight amount of between about 1 to about 20%, preferably about 1 to about 10%, more preferably about 2 to about 6%. This includes about 1%, 2%, 3%, 4%, 5%, 6%, 7%, 8%, 9%, 10%, 11%, 12%; 13%, 14%, 15%, 16%, 17%, 18%, 19% and 20%.

In one preferred embodiment, the composition further comprises an elastomeric polymer, such as a polyisobutene, butyl rubber or ethylene vinyl actetate. As an alternative to the elastomeric polymer, or in combination therewith, it has also been found that a resin such as pine resin provides a similar effect.

The elastomeric polymer and/or resin may be present in the composition, of the first aspect in a % by weight amount of between about 3 to 25%, preferably about 5 to 20%, more preferably about 6 to 15%, even more preferably about 8 to 11%.

Preferably, the elastomeric polymer is a polyisobutene or ethylene vinyl actetate. In a preferred embodiment, the polyisobutene elastomeric polymer is the commercially available polymer, Oppanol® manufactured by BASF. Any form of Oppanol® may be suitable. The chosen ethylene vinyl actetate may be purchased as Elvax® from DuPont.

The elastomeric polymer or resin provides an improved level of adhesion between composition and flotation device. It has also been found to reduce the small amount of 'sweating' out of certain ingredients through the base wax and clay. It also acts to retain the dryer components, which may be added, within the polymer/resin matrix. For example, the powdered oxide pigment agent will not deposit on a user's hands or other external surfaces to such a degree if the elastomeric polymer or resin is present.

If required, the composition may further comprise petroleum jelly and/or glycerine.

The petroleum jelly may be present in the composition of the first aspect in a % by weight amount of between about 1 to about 20%, preferably about 1 to about 10%, more preferably about 2 to about 6%. This includes about 1%, 2%, 3%, 4%, 5%, 6%, 7%, 8%, 9%, 10%, 11%, 12%, 13%, 14%, 15%, 16%, 17%, 18%, 19% and 20%. The petroleum jelly may be used as an alternative to lanolin, although lanolin is the preferred choice.

The glycerine may be present in the composition of the first aspect in a % by weight amount of between about 1 to about 20%, preferably about 2 to about 10%. This includes about 1%, 2%, 3%, 4%, 5%, 6%, 7%, 8%, 9%, 10%, 11%, 12%, 13%, 14%, 15%, 16%, 17%, 18%, 19% and 20%.

Optionally, the composition may further comprise a pigment agent and/or an aroma agent.

The pigment agent and the aroma agent may be present in the composition in a % by weight range of from about 5 to about 15%. It will be appreciated that the pigment and aroma agents are not essential components but may be valuable in a commercial sense in providing an attractive range of colours and scents to the repair composition.

A wide range of pigments and colourants are known in the art and may be suitable for use in the present compositions. In one preferred embodiment, a white pigment, zinc oxide (ZnO) is selected. Zinc oxide is a naturally source pigmented mineral, quarry mined and refined to a fluffy white powder. The compositions may be readily coloured to any desired colour by using various oxides that are commercially available such as red, green, black, blue, pink, orange or any combination thereof to blend with the existing external colour of the flotation device. However, it will also be appreciated by a skilled person that many commercially available pigments based on organic molecules, e.g. fluorescent dyes as well as inorganic dyes based on other metals are suitable and include titanium, sulphides, cyanides and lead as well as combined sulphates and sulphides, e.g. Lithopone, may also be suitable.

The aroma agent may be, for example, scented oils such as fragrant and natural essential oils, for example coconut oil or citrus oils.

In a preferred embodiment of the first aspect, the composition comprises:
Clay—20 to 60%
Wax—20 to 60%
Mineral oil—1 to 20%
Lanolin—1 to 20%
Elastomeric polymer/Resin—3 to 25%
by weight of the composition.

Preferably, the clay is ball clay.

Suitably, the wax is selected from the group consisting of beeswax, microcrystalline wax, carnauba wax, jelly wax, soy wax, palm wax, synthetic wax and paraffin wax.

Preferably, the elastomeric polymer is a polyisobutene such as Oppanol® and the resin is pine resin.

Optionally, the composition may further comprise a pigment and/or an aroma agent in a % by weight amount of 5 to 15%.

In a further preferred embodiment of the first aspect, the composition comprises:
Clay—30 to 50%
Wax—25 to 45%
Mineral oil—1 to 10%
Lanolin—1 to 10%
Elastomeric polymer/Resin—5 to 20%
by weight of the composition.

Preferably, the clay is ball clay.

Suitably, the wax is selected from the group consisting of beeswax, microcrystalline wax, carnauba wax, jelly wax, soy wax, palm wax, synthetic wax and paraffin wax.

Preferably, the elastomeric polymer is a polyisobutene such as Oppanol® and the resin is pine resin.

Optionally, the composition may further comprise a pigment and/or an aroma agent in a % by weight amount of 5 to 15%.

In still a further preferred embodiment of the first aspect, the composition comprises:
Clay—35 to 45%
Wax—30 to 40%
Mineral oil—2 to 5%
Lanolin—2 to 5%
Elastomeric polymer—7 to 12%
by weight of the composition.

Preferably, the clay is ball clay.

Suitably, the wax is selected from the group consisting of beeswax, microcrystalline wax, carnauba wax, jelly wax, soy wax, palm wax, synthetic wax and paraffin wax.

Preferably, the elastomeric polymer is a polyisobutene such as Oppanol® and the resin is pine resin.

Optionally, the composition may further comprise a pigment and/or an aroma agent in a % by weight amount of 5 to 15%.

In one specific example of the first aspect, the composition comprises:
Ball clay—40.9%
Paraffin wax—35.46%
Mineral oil—3.18%
Lanolin—3.18%
Polyisobutene (Oppanol®)—9.1%
Pigment agent—8.18%
by weight of the composition.

This composition has been found to provide a flotation device temporary repair composition which is malleable, can be easily worked into a damaged region of the flotation device, provides a water tight seal immediately upon being appropriately applied, has a low level of drag in the water, will continue to prevent water ingress for an extended period of time and which can be completely removed without the need to cut sections of the damaged region out.

It will be appreciated that variations of the relative amounts of the above ingredients or their being replaced by like ingredients may result in a repair composition demonstrating the desired properties but with slightly altered density, flexibility etc. This may desirable to aid in tailoring the composition to the particular climate in which it will be used and so, for example, the relative amount of base wax may be increased for use in warmer climes. The wax houses the other components which may be 'softer' and has a relatively high melting point so increasing its relative % by weight in the composition renders the composition more resistant to higher temperatures.

In a second aspect, the invention resides in a method of formulating a flotation device repair composition including the step of combining a wax and a metal silicate.

The flotation device repair composition may be as described in the first aspect.

The method may further include the step of combining one or more of mineral oil, petroleum jelly, an elastomeric polymer, a pigment agent or an aroma agent with the wax and metal silicate.

The method may further include the step of applying heat. The level of heat required will vary depending on the exact composition but temperatures of from about 40 to about 80° C., preferably about 50 to about 60° C., are contemplated.

The method may further include the step of increasing the amount of wax in the composition to improve its suitability for use in warmer climates. It will be appreciated that warmer climes will soften the composition and so higher levels of components which increase the density or overall melting point of the composition may be combined. Conversely, in colder climes the composition may become slightly less malleable and hence take a little longer to work into the damaged region of the flotation device to form an appropriate seal. This can be accounted for by combining higher relative amounts of softening agents such as the mineral oil or choosing softer waxes and clays with a high degree of plasticity.

In a third aspect, the invention resides in a method of temporarily repairing a flotation device including the steps of forming the flotation device repair composition of the first aspect and applying an effective amount of the composition to a damaged region of the flotation device to form a watertight seal around the region and thereby temporarily repair the flotation device.

The seal between the composition and the flotation device will become watertight immediately upon appropriate application to the damaged region.

It is one advantage of the present composition that substantially all of the applied composition can be removed from the damaged region by hand. When prior art surf waxes and the like are used for temporary repair of surfboards it is difficult to remove them again to allow professional permanent repair. It is often necessary to cut out a portion of the device to leave a suitable repair surface.

In use, the composition is preferably applied to a dry surface to ensure that no water has reached the interior of the damaged board or like device. However, the use of the present compositions are not so limited and may be applied with equal success to wet surfaces. The composition will be effective in keeping out water even if it is applied to a submerged damaged region. For example, the present composition may be used to temporarily seal a damaged region on the external or even internal surface of a boat through which water is leaking. If it is to be applied externally then the composition is simply worked into the damaged region, even if it should be underwater, to ensure complete coverage and this will prevent further ingress of water until the boat can reach the safety of the shore for permanent repair. It is a further advantage of the present composition of the first aspect that it can be used underwater and will adhere and form a seal with most surfaces including, glass, fibreglass, timber etc.

For use in cooler temperatures, the composition is simply kneaded for about 20 seconds to obtain the desired malleability. The composition is applied at a preferred minimum thickness of about 5 mm, covering the damaged area and about 10 mm surrounding the damaged area.

The time period of flotation device repair composition effectiveness is only minimally influenced by the temperature of the water and the water tight integrity of surf boards repaired using preferred compositions has not been compromised or failed over a year long in-house trial. The composition will likely only be compromised by relatively high temperatures, such as those which can occur inside automobiles on very hot days, rather than those experienced in the water or in the outdoors generally.

The flotation device to which the composition can be applied to bring about a temporary repair is not particularly limited but typical examples may be selected from the group consisting of surfboards, funboards, paddle boards, sailboards, surf skis, kayaks, canoes, boats and flotation aids.

In order that the invention may be readily understood and put into practical effect, particular embodiments will now be described by way of the following non-limiting examples.

EXAMPLES

Example 1

A relatively large scale batch of temporary flotation device repair composition was formulated by combining ball clay (45 kg), paraffin wax (39 kg), mineral oil (3.5 kg), lanolin (3.5 kg), Oppanol® (10 kg) and a pigment such as ZnO (9 kg) over a gentle heat sufficient to liquefy the waxes.

Generally, the wax will be heated and melted first. Once the wax is liquefied then all of the other liquid ingredients will be added while constantly stirring at high speed. In this case the mineral oil is added to the liquid wax. Once the liquid ingredient(s) combine with the liquid wax with no visible solids, the solid or dry ingredients may be added.

The addition of the dry ingredients requires constant high speed mixing. In this instance, the lanolin (lanolene® is used), the Oppanol® and then the pigment (ZnO) are added. The clay is the final component to be introduced. This mixture is continually stirred over heat until the ingredients are intimately mixed with no visible lumps. At this stage the composition is ready for pouring. The composition may be poured into moulds to allow it to set. Once set it may be turned out and is ready for use.

This results in a flotation repair composition having the below approximate % by weight amounts of the total composition.
Ball clay—40.9%
Paraffin wax—35.46%
Mineral oil—3.18%
Lanolin—3.18%
Polyisobutene (Oppanol®)—9.1%
Pigment agent—8.18%

Example 2

A typical small scale flotation device repair composition is prepared by combining microcrystalline wax (200 g), mineral oil (50 ml), lanolin (30 g) and ball clay (300 g) over heat. The composition begins to melt at ca 55° C. and is well combined at ca 80 to 90° C. To this solution, white pigment zinc oxide (25 g) and scented oil (5 ml) are both added.

This results in a flotation repair composition having the below approximate % by weight amounts of the total composition.
Ball clay—49%
Microcrystalline wax—32.5%
Mineral oil—8%
Lanolin—4.5%
Pigment agent (ZnO)—3%
Aroma agent (Scented oil)—3%

Example 3

As a variation on the flotation device repair composition of example 2, the substitution of beeswax for microcrystalline wax is contemplated. In this example, beeswax (200 g), lanolin (25 g) and ball clay (300 g) are combined over heat (ca 55° C. This base composition is coloured white using zinc oxide (25 g) and scented using coconut oil (25 ml).

This results in a flotation repair composition having the below approximate % by weight amounts of the total composition.
Ball clay—52.1%
Beeswax—34.7%
Lanolin—4.34%
Pigment agent (ZnO)—4.34%
Aroma agent (Coconut oil)—4.52%

Example 4

In another variation, petroleum jelly (30 g) is substituted for lanolin. In this example, microcrystalline wax (200 g), mineral oil (30 ml), petroleum jelly (30 g) and ball clay (300 g) are combined over heat (ca 55° C.) prior to colouring with pigment (zinc oxide, 25 g) and scented using coconut oil (5 mL).

This results in a flotation repair composition having the below approximate % by weight amounts of the total composition.
Ball clay–48.3%
Microcrystalline wax—34.2%
Mineral oil—5.8%
Petroleum jelly—5.8%
Pigment agent (ZnO)—4%
Aroma agent (Coconut oil)—1.9%

Example 5

In this example, ball clay (300 g), lanolin (30 g) and glycerine (30 ml) are combined over heat. The mixture is then pigmented with zinc oxide (25 g) and scented with coconut oil (5 ml). While still effective as a temporary repair composition, this variation has been shown to be shorter lasting than compositions using a 'base' wax, such as beeswax, microcrystalline wax or paraffin wax, in addition to the lanolin wax.

This results in a flotation repair composition having the below approximate % by weight amounts of the total composition.

Ball clay—76%
Glycerine—7.7%
Lanolin—7.7%
Pigment agent (ZnO)—6.4%
Aroma agent (Coconut oil)—2.2%

The flotation device temporary repair composition described herein provides a number of distinct advantages over the prior. The interaction of a number of the components with one another to produce a cohesive and stable, waterproof composition could have been predicted. The present composition is a more reliable 'instant fix' for damaged flotation devices which is also easily completely removed from the damaged area to allow subsequent permanent repair. The composition comprises safe ingredients which are not banned from travel on aircraft and the like thereby providing for a convenient travel pack when on overseas surfing or boating trips.

It will be appreciated by the skilled person that the present invention is not limited to the embodiments described in detail herein, and that a variety of other embodiments may be contemplated which are, nevertheless, consistent with the broad spirit and scope of the invention.

The invention claimed is:

1. A flotation device repair composition comprising:
   a wax in an amount between 20 to 60% by weight of said composition;
   a metal silicate having a % by weight greater than that of said wax, said metal silicate being ball clay in an amount between 20 to 60% by weight of said composition, said ball clay comprises from 20 to 80% kaolinite, 10 to 25% mica and 6 to 65% quartz;
   a mineral oil in an amount between 1 to 20% by weight of said composition;
   lanolin in an amount between 1 to 20% by weight of said composition; and
   an elastomeric polymer and resin in an amount between 3 to 25% by weight of said composition.

2. The composition of claim 1, wherein said wax is selected from the group consisting of beeswax, microcrystalline wax, carnauba wax, jelly wax, soy wax, palm wax, synthetic wax and paraffin wax.

3. The composition of claim 1, wherein said elastomeric polymer being selected from the group consisting of a polyisobutene, a butyl rubber and an ethylene vinyl acetate.

4. The composition of claim 1, wherein said elastomeric polymer is a polyisobutene, and said resin is pine resin.

5. The composition of claim 1 further comprising petroleum jelly in an amount between 1% to 20% by weight of said composition.

6. The composition of claim 5 further comprising glycerin in an amount between 1% to 20% by weight of said composition.

7. The composition of claim 6 further comprising a pigment agent in an amount between 2% to 15% by weight of said composition.

8. The composition of claim 7 further comprising an aroma agent in an amount between 2% to 15% by weight of said composition.

9. The composition of claim 8, wherein said wax is selected from the group consisting of beeswax, microcrystalline wax, carnauba wax, jelly wax, soy wax, palm wax, synthetic wax and paraffin wax.

10. The composition of claim 8, wherein said elastomeric polymer is one of polyisobutene and ethylene vinyl acetate, and said resin is pine resin.

11. The composition of claim 8, wherein said pigment agent is in an amount of 5% to 11% by weight of said composition.

12. A method of using a flotation device repair composition, said method comprising the steps of:
   a) forming a flotation device repair composition, said composition comprising:
      a wax in an amount between 20 to 60% by weight of said composition;
      a metal silicate having a % by weight greater than that of said wax, said metal silicate being ball clay in an amount between 20 to 60% by weight of said composition, said ball clay comprises from 20 to 80% kaolinite, 10 to 25% mica and 6 to 65% quartz;
      a mineral oil in an amount between 1 to 20% by weight of said composition;
      lanolin in an amount between 1 to 20% by weight of said composition; and
      an elastomeric polymer and resin in an amount between 3 to 25% by weight of said composition; and
   b) applying an effective amount of said composition to a damaged region of a flotation device to form a watertight seal around said damaged region and repairing said flotation device.

* * * * *